United States Patent [19]

Downs et al.

[11] 3,949,895

[45] Apr. 13, 1976

[54] EPOXY EXTERIOR COATING FOR LAP-SEAM BEVERAGE CANS

[75] Inventors: John D. Downs, Bradley; Andrew Leo Massa, Kankakee, both of Ill.

[73] Assignee: Mobil Oil Corporation, New York, N.Y.

[22] Filed: Feb. 24, 1975

[21] Appl. No.: 552,459

Related U.S. Application Data

[63] Continuation of Ser. No. 420,401, Nov. 30, 1973, Pat. No. 3,888,808, which is a continuation-in-part of Ser. No. 293,635, Sept. 29, 1972, abandoned.

[52] U.S. Cl............ 220/64; 220/81 R; 260/18 EP; 260/31.4 EP; 260/33.6 EP; 260/37 EP

[51] Int. Cl.²............................................ B65D 7/42

[58] Field of Search..... 260/18 EP, 47 EP, 32.6 EP, 260/31.4 EP, 33.6 EP, 37 EP; 220/81 R, 75, 64

[56] References Cited

UNITED STATES PATENTS

| | | | |
|---|---|---|---|
| 2,759,901 | 8/1956 | Greenlee | 260/37 EP |
| 2,873,261 | 2/1959 | Lederman | 260/18 EP |
| 3,040,781 | 6/1962 | Reymann et al. | 220/64 |
| 3,043,788 | 7/1962 | Bressler et al. | 260/18 EP |
| 3,247,974 | 4/1966 | Wynstra et al. | 260/18 EP |
| 3,411,542 | 11/1968 | Walsh et al. | 220/81 R |
| 3,437,063 | 4/1969 | Battersby | 220/75 |
| 3,477,974 | 11/1969 | de Ruyter et al. | 260/18 EP |
| 3,547,881 | 12/1970 | Mueller et al. | 260/18 EP |
| 3,594,340 | 7/1971 | Hollis et al. | 260/18 EP |
| 3,773,589 | 11/1973 | Kaiser et al. | 220/75 |
| 3,819,085 | 6/1974 | Rohowetz | 220/81 R |

OTHER PUBLICATIONS

"Varnish Constituents" by Chatfield; Leonard Hill Ltd., London, 1953.

*Primary Examiner*—Eugene C. Rzucidlo
*Attorney, Agent, or Firm*—Charles A. Huggett; Hastings S. Trigg

[57] ABSTRACT

There is provided a thermosetting resin comprising a polyglycidyl ether of a bisphenol of relatively low molecular weight, which is upgraded in molecular weight by reaction with additional bisphenol and esterified with certain fatty acid mixtures from a tall oil source. When these resins are reduced with organic solvents to approximately 50 percent solids content they are useful exterior coatings for lap-seam beverage cans in which the seam is sealed with a nylon adhesive.

3 Claims, No Drawings

EPOXY EXTERIOR COATING FOR LAP-SEAM BEVERAGE CANS

CROSS-REFERENCE TO RELATED APPLICATIONS

This is a continuation of application Ser. No. 420,401, filed Nov. 30, 1973, now U.S. Pat. No. 3,888,808, which is a continuation-in-part of application Ser. No. 293,635, filed Sept. 29, 1972, now abandoned.

BACKGROUND OF THE INVENTION

1. Field of the Invention

This invention provides modified epoxy resins useful in thermosetting coatings.

2. Description of the Prior Art

Epoxy coatings have been proposed in which it is necessary to use an aminoplast to affect cross-linking for good adhesion. Using the specified materials in the resin of this invention, it has been found that cross-linking is not necessary. It has been found that the esterifying acids used in the resins of this invention must be specific fractions from tall oil acids. Acids from other sources, as soya bean oil, produce resins that are too viscous for practical coating applications on a commercial scale.

SUMMARY OF THE INVENTION

This invention provides a thermosetting resin that comprises a polyglycidyl ether of a bisphenol upgraded in molecular weight with additional bisphenol and esterified with an unsaturated fatty acid mixture obtained from tall oil, comprising, by weight, 25 to 55 percent oleic acid, 35 to 65 percent linoleic acid, with the balance essentially being conjugated linoleic acid. It also provides a coating composition comprising said resin in an organic solvent.

DESCRIPTION OF SPECIFIC EMBODIMENTS

The resins to be described hereinafter in detail, when placed in a solvent to form a thermosetting coating, can be applied as an exterior base coating for lap-seam beverage cans. An advantage of this coating is that the entire exterior surface is coated, without the necessity of leaving a margin for the lap-seam. In order to provide a good adhesion when the seam is sealed with a nylon adhesive, it has been found that the resin, after it is baked, must exhibit good resistance to methyl ethyl ketone (MEK). This is determined by 100 double rubs with a cloth saturated with MEK. Indeed, good coordination has been found with the MEK resistance characteristics and the lap-seam bonding strength.

The initial epoxy resin, utilized herein, can be any polyglycidyl ether of polyhydric organic compounds, especially polyhydric phenols. Particularly preferred are the glycidyl ethers of bisphenols, a class of compounds which are constituted by a pair of phenolic groups interlinked through an intervening aliphatic bridge. While any of the bisphenols may be used, the compound 2,2-bis(p-hydroxyphenyl) propane, commonly known as bisphenol A, is more widely available in commerce and is preferred. While polyglycidyl ethers can be used, diglycidyl ethers are preferred. The initial epoxy resin will have a molecular weight of between about 170 and about 200, and an Epoxy Value between about 0.50 and about 0.60.

The reactant, which is reacted with the polyglycidyl ether, is a bisphenol, preferably bisphenol A.

Using stoichiometric amounts of each, the reaction between the polyglycidyl ether and the additional bisphenol is carried out at temperatures of about 215° to about 225°C. for a period of time which can vary between about 20 and about 30 minutes. This reaction will exhibit an exotherm and should be continued for about 30 minutes after the time of peak exotherm (20–30 min.), before sampling for WPE (Weight per Epoxy). In order to be effective herein, this condensation product should attain a WPE of between about 1600 and about 2000.

After the initial condensation, the product (upgraded epoxy) is esterified with an unsaturated fatty acid mixture, obtained from tall oil, containing, by weight, 25 to 55 percent oleic acid, 35 to 65 percent linoleic acid with the balance essentially being conjugated linoleic acid. The fatty acid mixtures utilizable herein are obtained by fractionating tall oil acid mixtures by vacuum distillation usually at 250°–280°C. depending upon pressure. The tall oil acid mixtures that are distilled are generally obtained by caustic and steam treatment of tall oil, followed by acidification. It appears that due to the heat used in the distillation some of the linoleic acid (unsaturated at the 9 and 12 positions) is isomerized to effect conjugated unsaturation at the 9 and 11 and/or 10 and 12 positions. Such acids are known and reported as conjugated linoleic acid [Kirk-Othmer Encyclopedia of Chemical Technology Vol. 13, page 575, Interscience Encyclopedia, Inc. New York (1954)]. The saturated fatty acids (chiefly palmitic acid) in tall oil can be reduced to a small amount, about 0–2 percent, in the vacuum distillation or by "winterizing", i.e., fractional crystallization. Many tall oil fatty acid mixtures of various compositions are readily available commercially. Usually, the mixtures utilizable contain very minor amounts (2–3.5 weight percent total) of saturated fatty acids, resin (rosin) acids, and unsaponifiables.

The weight ratio of upgraded epoxy to fatty acid mixture will be between about 65:35 and about 70:30. The esterification reaction will be carried out at temperatures between about 225° and about 250°C., for a period of time between about 6 hours and about 8 hours. An esterification catalyst can be used, e.g., dibutyl tin dilaurate, triphenyl phosphite, etc., in catalytic amounts (0.05–0.2 wt. percent).

In order to prepare the coating, the resin is then dissolved in a suitable solvent and reaction is continued until there is attained a Gardner-Holt Viscosity of between $Z_3$ and $Z_5$ and an Acid Number below 1.0. In general, aromatic, organic solvents are used. In practice, it is preferred to use mixtures or cuts of aromatic hydrocarbons which can boil between about 360° and about 490°F. It is also preferred to use, in addition to the aromatic hydrocarbon, an oxygen-containing solvent, such as diacetone alcohol or cello-solve acetate (ethoxyethylacetate). In the following examples are demonstrated the specific esterifying fatty acids utilizable in order to attain good MEK resistance. In all examples, parts are by weight unless otherwise indicated.

EXAMPLE 1

A mixture of 46.4 parts of diglycidyl ether of bisphenol A (molecular weight 185–195; and epoxy value 0.50–0.54) and 23.5 parts of bisphenol A were reacted until a WPE value of 1800 was obtained. The resultant resin was then esterified with 29.9 parts of a tall oil fatty acid mixture containing 81 weight percent oleic acid, 14 weight percent linoleic acid, 3 weight percent saturated fatty acids, 0.2 weight percent resin acids, and 0.4 weight percent unsaponifiables ("Pamolyn 125", Hercules). There was added 0.1 percent dibutyl tin dilaurate catalyst. The esterified product was then dissolved in a solvent mixture to 50 percent solids. The solvent mixture used contained 29 percent of an aromatic hydrocarbon boiling at 460°–547°F., 50 percent of an aromatic hydrocarbon cut boiling at 364°–415°F., and 21 percent diacetone alcohol. The resultant coating was applied to steel test specimens and baked for about 8 minutes at 410°F. The resultant coating had poor MEK resistance.

EXAMPLE 2

Example 1 was repeated, except that the fatty acid mixture used contained 30 parts oleic acid, 58 parts linoleic acid, 9 parts conjugated linoleic acid, 1 part saturated fatty acid, 0.9 part resin acid, and 1.3 parts unsaponifiables ("Pamolyn 240", Hercules). The baked coating from this run exhibited good MEK resistance.

EXAMPLE 3

Example 1 was repeated except that the fatty acid mixture contained 51 parts oleic acid, 40 parts linoleic acid, 7 parts conjugated linoleic acid, and 2 parts saturated fatty acids ("Actinol FA3", Arizona Chemical Company). The baked coating showed good MEK resistance.

EXAMPLE 4

A resin coating was prepared as described in Example 2, except that the solvent used was a mixture of 29 percent of a 99 percent aromatic and 1 percent saturated aliphatic hydrocarbon cut boiling at 396°–490°F.; 50 percent of a mixture of aromatic hydrocarbon boiling at 364°–415°F., and 21 percent cellosolve acetate. The coating thereof prepared had excellent flow properties and when a baked finish was prepared from it, the finish showed good MEK resistance.

The resin coatings described thus far were clear materials, as is usual in the art. They may be further modified with pigments, as well as well-known additives to improve coating characteristics, such as flow agents. A particularly useful coating is a white base coating useful for can exteriors. Such a coating is described in the following example:

EXAMPLE 5

Into a high-speed mixer there were charged 11.2 pounds of the coating described in Example 4, and 3.7 pounds of aromatic hydrocarbon having a boiling range of 365°–415°F. While under high speed agitation there was added slowly 33.8 pounds of titanium dioxide and agitation was continued until a fineness of grind of 7¾ was obtained. Under reduced agitation conditions, there were added an additional 31.0 pounds of 50 percent solids coating of Example 4, 13.9 pounds of aromatic hydrocarbon, 6.3 pounds of 2-ethoxyethylacetate and 0.1 pound of a flow control agent. This mixture was stirred until uniform. The resultant product was a ready-to-use finish having a solids content of 54–56 percent, a pigment to binder ratio of 1.6/1.0 and a viscosity of 70–90 seconds, number 4 Ford Cup at 80°F.

METAL CONTAINER FORMATION

The coatings of this invention are particularly suitable for exterior coating of metal containers having lap seams bonded with nylon resin adhesives. In practice, the exterior surface of a container blank is coated with a coating of this invention and the resultant coating is baked. When using prior art coatings it was necessary to leave an uncoated margin at the seam line, in order to obtain metal to metal bonding. This is not necessary in the use of the coatings of this invention, because excellent bonding can be obtained with a metal to coating contact at the seam. Appropriate baking temperatures are from 250° to 500°F. for periods of time varying from one-half hour at the lowest temperature to one-half minute at the highest temperature.

The adhesives used to bond the lap seams of metal containers coated with the coatings of this invention are thermoplastic dimer based polyester-polyamides, as described in U.S. Pat. No. 3,397,816. In general the adhesive is a polyesteramide - polyamide composition having improved peel strength comprising the condensation product at temperatures in the range of 150°–300°C. of a mixture of (A) a diamine of the formula $$H_2N - R' - NH_2$$

where R' is an aliphatic hydrocarbon radical of from 2 to 20 carbon atoms and (B) a hyroxyamine of the formula $$H_2N - R''' - OH$$

where R''' is a divalent aliphatic hydrocarbon radical having from 2 to 8 carbon atoms with a mixture of (C) a dicarboxylic compound of the formula $$R''OOC - R - COOR''$$

where R is a divalent hydrocarbon radical of from 2 to 20 carbon atoms and R'' is selected from the group consisting of hydrogen and aliphatic hydrocarbon radicals having from 1 to 8 carbon atoms and (D) polymeric fat acids having a dimeric fat acids content of greater than 80 percent by weight and a trimeric to monomeric fat acids ratio substantially within the area ABCD defined in the drawing of U.S. Pat. No. 3,397,816, the sum of the molar equivalents of amine and hydroxy groups employed being essentially equal to the molar equivalents of carboxylic groups employed, the molar equivalents ratio of said polymeric fat acids to said dicarboxylic compound being in the range of from 1:0.05 to 1:0.5 and the molar equivalent ratio of said diamine to said hydroxy amine being in the range of from 20.0 to 0.5.

The particular nylon adhesive used for exemplification purposes herein has an ultimate tensile of 6200–7200 psi.; a yield stress of 3400–4700 psi.; a tensile modulus of 60–80×10³ psi.; a Vicat softening point of 172°–174°C.; and a recommended bonding temperature of 450°F. This adhesive is "Milvex" Specialty Nylon Resin 1250, described in Bulletin SP3-69 of General Mills, Inc. Chemical Division.

The strength of a seam bond on the coated metal is determined in accordance with the following test method.

PEEL ADHESION TEST

To evaluate plate variables, the coating under test is applied to tin free steel plate (commonly used for making containers) to give a dry film weight of 8 mgs./sq. in. using a drawbar, roller coater, or dip coater. The coating should be baked in a circulating air oven to give 10 minutes at 400°F.

Test samples are prepared by cutting the coated plate, transverse to the rolling direction if possible, into 0.750 inch strips 4 to 9 inches in length. The strips, coated side, are preflamed at 500°–525°F. for 400 milliseconds. The aforedescribed adhesive (Milvex 1250), film or pellets, is heat-tacked to the coated test strip on a 410° to 43°F. hot plate. The cement must be free of absorbed moisture. If the cement bubbles when melted, it should be dried for 3–6 hours at 170°F. prior to use. Generally, three pellets are spaced along the width of the strip approximately one-eighth inch from the bottom edge. If film is used, a piece ¼ × ¾ inch × 5 mils is heat tacked along the bottom edge of the coated plate. A second test strip is placed over the strip containing the adhesive.

Several methods can be used to form a bond; the most convenient method utilizes a hydraulic press with heated platens. The platens are shimmed to maintain a 3 mil adhesive layer between the bonded test strips. At platen temperatures of 450°F., the sample is placed between the platens and pressure is slowly applied in a manner which permits the cement pellets to melt and flow without undue force being applied to the adhesive system. Approximately 15 seconds are required to close the press and develop 8,000 lbs. gauge pressure. The sample is allowed to remain under pressure for 5 seconds and is then removed from the press and cooled immediately after bonding - steel roller/steel block. At a platen temperature of 500°F. approximately 5 seconds is required to close the press and hold time is 5 seconds. Depending on the direction of "squeeze-out", the bonded area will be ¾ inch (test strip width) × ⅜ to ½ inch.

Samples are peeled over a 180° roll peel fixture on a tensile tester at a crosshead speed of 2 inches/minute. The highest force attained is recorded for each sample, as well as the type of failure, i.e., percent enamel removed from either plate surface.

Good plate should have peel adhesion averaging approximately 60 lbs./3/5 inch width (including 5 lb. blank), with individual peels in the range of 45 to 80 lbs. A minimum acceptable peel has been set at 40 lbs. These values apply to samples prepared using a gas or electric fired oven to bake the enamel coating.

EXAMPLE 6

Using the clear coating described in Example 4, test samples were prepared and subjected to the Peel Adhesion Test. The test samples showed adhesion of 55–60 pounds.

EXAMPLE 7

Using the pigmented coating described in Example 5, test samples were prepared and subjected to the Peel Adhesion Test. The test samples showed adhesion of 50 pounds.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A metal container, exterior coated with a coating composition comprising an inert organic solvent having dissolved therein a thermosetting resin that consists essentially of a polyglycidyl ether of a bisphenol, having a molecular weight of between about 170 and about 200 and an Epoxy Value between about 0.50 and about 0.60, upgraded in molecular weight with a stoichiometric amount of additional bisphenol by reaction at temperatures of between about 215° and about 225°C. for between about 20 minutes and about 30 minutes, forming an upgraded epoxy having a WPE of between about 1600 and about 2000; and said upgraded epoxy being esterified with an unsaturated fatty acid mixture, obtained from tall oil, consisting essentially of, by weight 25 to 55 percent oleic acid, 35 to 65 percent linoleic acid, with the balance essentially being conjugated linoleic acid; esterification being carried out using a weight ratio of upgraded epoxy: fatty acid mixture of between about 65:35 and about 70:30 at temperatures between about 225° and about 250°C. for between about 6 hours and about 8 hours and having a Gardner-Holt Viscosity of between $Z_3$ and $Z_5$ at 50 percent solids and an Acid Number below 1.0; said container having seams, said seams being bonded with a nylon adhesive in contact with said coating composition.

2. The metal container of claim 1, wherein in said coating composition said ether is a diglycidyl ether of bisphenol A and said additional bisphenol is bisphenol A; said fatty acid mixture contains, by weight, 30 parts oleic acid, 58 parts linoleic acid, and 9 parts conjugated linoleic acid; and said solvent is a mixture of 29 percent of a 99 percent aromatic and 1 percent saturated aliphatic hydrocarbon cut boiling at 396°–490°F.; 50 percent of a mixture of aromatic hydrocarbon boiling at 364°–415°F.; and 21 percent ethoxyethyl acetate.

3. The metal container of claim 2, wherein said coating composition contains a titaniumdioxide pigment in a pigment to binder ratio of 0.5/1 to 1.8/1.

* * * * *